April 30, 1963  C. ULLRICH  3,088,092
QUICKLY APPLICABLE AND REMOVABLE BUS BAR
Filed Jan. 16, 1956

INVENTOR.
Clarence Ullrich
BY
Eugene M. Giles Atty.

United States Patent Office 3,088,092
Patented Apr. 30, 1963

3,088,092
QUICKLY APPLICABLE AND REMOVABLE BUS BAR
Clarence Ullrich, Oak Park, Ill., assignor, by mesne assignments, to Ferro Corporation, Cleveland, Ohio, a corporation of Ohio
Filed Jan. 16, 1956, Ser. No. 559,464
1 Claim. (Cl. 339—248)

This invention relates to bus bars which are adapted to extend between and electrically interconnect spaced apart terminals of electrical devices, and has reference more particularly to a bus bar wherein the facilities for attachment thereof to the terminals are integral portions of the bus bar strip, and to a method of making a bus bar with such facilities.

Bus bars of the type to which this invention relates are commonly used in electrical appliances, as for example electric ranges, for making an electrical connection to terminals of a group of switches, so that proper connections may be made therewith unmistakably and quickly, and it is important not only that such bus bars be simple and reliable so that they may be readily made and are convenient to use, and make and maintain the connections with certainty, but it is also important to minimize the cost thereof and avoid any parts which may become loose and prevent switch operation.

Bus bars have been provided heretofore for this purpose, but did not have the desired simplicity, reliability and low cost.

The principal objects of the present invention are to provide an improved bus bar for such purpose having improved connecting facilities by which it is readily connectible to switches; to simplify the construction of such bus bars; to eliminate assembling operations in the construction thereof; to utilize integral portions of the bus bar strip to provide the facilities for attachment thereof to the terminals; to construct the attaching facilities so they are applicable to commonly used types of switch terminals; and to provide an improved method of making such bus bars, these and other objects being accomplished as pointed out more particularly hereinafter and as shown in the accompanying drawing in which:

FIG. 1 is a top view showing a series of similar switches with bus bars of the present invention connecting corresponding terminals thereof, one of the bus bars having an end thereof broken away to show the terminal to which it is attachable at that place;

FIG. 2 is a rear view of the switches and bus bars of FIG. 1;

FIG. 3 is a side view of a terminal like those to which the bus bars are connected in FIGS. 1 and 2, and showing in section a fragmentary portion of the rear of the switch case through which the terminal projects;

FIG. 4 is an edge view of the terminal of FIG. 3 looking at a lengthwise edge thereof;

FIG. 5 is an enlarged cross sectional view of the terminal of FIG. 3 taken on the line 5—5 thereof;

FIG. 6 is a similarly enlarged cross sectional view of the terminal of FIG. 3, taken on the line 6—6 thereof;

FIG. 7 is a side view of a fragmentary portion of the length of one of the bus bars showing one of the connections thereof and looking at that side thereof at which the connection is located; and FIG. 8 is a longitudinal sectional view of the bus bar portion of FIG. 7 taken on the line 8—8 thereof.

The bus bar as shown in the drawing is adapted to be connected to the corresponding terminals of a plurality of switches which are mounted in line in side-by-side relation, and for the purpose of illustration switches are shown like those of my copending application Serial No. 342,450, filed March 16, 1953, now Patent No. 2,739,208, of which the present application is a continuation in part. Each said switch is indicated as a whole by the reference numeral 10 and each has three current supply or input terminals, indicated respectively as a whole by the reference numerals 11, 12 and 13 for connection respectively to the three wires of a three wire current supply system, and three bus bars of the present invention, and indicated respectively by the reference numerals 14, 15 and 16, are shown in connection with these switches, each said bus bar being provided at properly spaced intervals with connecting means, each indicated as a whole by the reference numerals 17 by which the bus bar is connected to the particular series of terminals 11, 12 or 13 that are to be serviced thereby. Each bus bar 14, 15 and 16 is adapted to be connected to one of the three wires of the three wire current supply system and each may have for this purpose a terminal screw 18 at one end thereof as indicated (in the case of the bus bar 14 only) in FIGS. 1 and 2.

Each switch 10 comprises a case 19 of insulating material which contains switch mechanism, such for example as that shown in my aforesaid copending application, and each said switch is secured at the front thereof to a wall or panel 20, each said switch being provided at the front of the wall or panel 20 with a knob 21 by which the switch mechanism of that switch is operable to control the supply of current through the switch from the terminals 11, 12 and 13 to a plurality of output terminals 22 thereof to which conductors (not shown) are connected which lead to the electrical device, for example a heating unit, which is to be operated by the current supplied through the switch.

Current control devices, such as the switches 10 shown herein, are commonly provided with terminals in the form of a projecting tongue to serve as the male member of a two part separable connector, the other part of which is of female member form adapted to slip on the male tongue member of the switch and is connected to a conductor leading to or from the switch to supply current thereto or therefrom and the input terminals 11, 12 and 13 are of such projecting tongue male member type. Also the switch output terminals are usually of the same male tongue form as the input terminals, and the input terminals 22 herein are the same as the input terminals 11, 12 and 13.

Such projecting tongue male members are usually of substantially a standardized size and of the same general nature and may be made either of sheet metal of a thickness to afford adequate stiffness for the purpose or they may be made as shown and described in my aforesaid copending application, of a thinner sheet metal shaped to provide a stiffening thereof commensurate with that of the thicker sheet metal tongues and these tongues are adapted to fit sufficiently snugly within the mating female member and over a sufficient area of contact with one another to insure good electrical conductivity from the one member to the mating member.

Such tongues are also usually arranged to interlock with the mating female member when fully engaged therewith to hold the members against accidental separation, and for this purpose the tongue is usually provided with an opening therethrough or a depression therein (usually one on each side) which registers with and has resilient engagement with a small projection of the female member, when the members are fully engaged, to hold the members sufficiently securely against separation to prevent separation thereof unless a positive and intentional separation pull is exerted thereon.

Generally also these connectors are made reversible, that is, so that the female member may be applied in either of two half turned positions on the tongue, the above mentioned opening through the tongue, or the depressions on both sides thereof, permitting the same interlocking in each of the reversed positions.

The terminals 11, 12 and 13 of the switches 10 on the one hand and the connections 17 of the bus bars 14, 15 and 16 on the other hand, are mating members of separable two part connectors of the above mentioned type, the switch terminals 11, 12 and 13 being the male or tongue members thereof and the bus bar connectors 17 being the female members thereof and the switch terminals 11, 12 and 13, and also the terminals 22, are shown herein for purposes of illustration, as of the above mentioned thinner sheet metal form.

One such terminal is shown in FIGS. 3 and 4 and as shown therein it comprises a tongue 23 which projects through a slit 24 in the rear wall 25 of the switch case 19 and is secured in the slit 24 by an offset 26 of the tongue material at the inner side of the wall 25 and a pair of spurs on the tongue at the outer side of the wall 25 which are bent outwardly or staked at the ends of the slit 24 as indicated at 27 to clamp the wall 25 between the offset 26 and the spurs 27.

For reinforcing the tongue 23 and to provide overall thickness for connecting with a female connecting member as hereinafter explained, the tongue 23 has an internal slit 28 extending lengthwise thereof and an internal crosswise slit 29 with the portions which are directly opposite one another at opposite sides of each slit 28 and 29 bent laterally from the plane of the tongue 23, each in a direction opposite to that of the other, and an opening 30 is provided at the intersection of the slits 28 and 29 for interlocking with a projection of a female fastener member as explained above, this opening 30 and the cross slit 29 being preferably closer to the outer end of the tongue 23 than they are to the wall 25 as shown in FIG. 4.

Thus the portions at the opposite sides of the longitudinal slit 28 are divided into two portions by the crosswise slit 29, the two thus divided portions at one side of the longitudinal slit 28 being indicated at 31 and 32 respectively and the respective portions at the other side of said slit being indicated at 33 and 34, and as indicated in FIGS. 5 and 6 the portions 31 and 33 are bent from the plane of the tongue 23 in opposite directions respectively, and the portion 32 is bent from the plane of the tongue in a direction opposite to that of the portions 31 and 34 but in the same direction as the portion 33, and two diametrically opposed quarter portions of the periphery of the opening 30 are defined by the portions 31 and 34 which are bent outwardly from one side of the plane of the tongue 23, whereas the other two diametrically opposed quarter portions of the periphery of the opening are defined by the portions 32 and 33 which are bent outwardly from the other side of the plane of the tongue 23.

The outwardly bent portions 31, 32, 33 and 34 are slightly resilient and by reason thereof provide a resilient frictional engagement with an appropriate female connecting member as hereafter explained, and the longitudinal slit 28 and the bent opposite side portions 31 and 33 are preferably continued sufficiently into the slit 24 of the back wall of the switch case to stiffen the tongue at the place of emergence thereof from the slit 24 and to increase the security of the attachment of the tongue to the wall 25.

Each bus bar 14, 15 and 16 is a relatively stiff strip of brass or other metal of good electrical conductivity, and at suitable intervals of the length thereof corresponding to the spacing of the series of terminals 11, 12 or 13 with which it is to be connected, each bus bar strip is provided with connecting means 17 of the aforesaid female type for reception therein of the respective group of switch terminals 11, 12 or 13.

One such female connecting means 17 is shown in FIGS. 7 and 8 wherein the reference numeral 35 indicates a portion of the length of one of the bus bars 14, 15 or 16, and in said FIGS. 7 and 8 the reference numerals 36 and 37 indicate two wings which project outwardly from one side of the bus bar portion 35 at a suitable distance apart to receive a tongue 23 edgewise therebetween in a position overlying that portion 38 of the strip 35 lying between the root ends of the wings 36 and 37, and these wings are bent inwardly toward one another over the portion 38, as indicated respectively at 36ᵃ and 37ᵃ, and with their inner edges suitably spaced from one another to receive the lateral edge portions only of the tongue 23 thereunder and at such distance from the strip portion 38 to cause the offset or bent portions 31 and 34 or 33 and 32, as the case may be, to bear resiliently and snugly against the said portion 38 of the bus bar between the flanges 36 and 37, and the other two of said offset or bent portions 31 and 34 or 33 and 32 lying between the separated inner edges of said inwardly bent wing portions 36ᵃ and 27ᵃ, all as shown in FIG. 2.

For interlocking the tongue 23 in its inserted position between the wings 36, 37 of the female fastener 17, the strip portion 38 between the wings 36 and 37 is provided with a small projection 39 which is located centrally between the wings or flanges 36 and 37 and approximately midway of the width of the bus bar portion 35 and projects at the side of the portion 38 at which the wings 36 and 37 are located so that when a tongue 23 is inserted to the proper extent in this female fastener, the projection 39 registers with and engages the opening 30 of the tongue 23 or male fastener member to interlock therewith and retain the male fastener member securely in the female member 17 against accidental separation therefrom, and it is to be noted that by reason of the construction of the male fastener 23 it may be inserted in and interlocked with the female fastener member in reversed positions, that is, with either the two bent portions 31 and 34 or the bent portions 33 and 32 bearing against the intermediate portion 38 of the bus bar strip 35.

It is an important feature of this invention that the wings or flanges 36 and 37 and also the projection 39, are formed from the strip stock 35 of the bus bars 14, 15 and 16 without requiring any attached parts, and to this end the wings 36 and 37 are cut out from the strip 35 along three sides, and bent outwardly from the strip along the remaining attached side, or root end of the wing as it is referred to above, leaving an opening 40 through the strip 35 at the place where the wing is formed therefrom.

This may be accomplished by a punch which shears the wing 36 or 37 from the strip stock 35 along the three sides where it is to be cut therefrom, and bends the thus cut piece outwardly from the side of the strip, whereupon the ends 36ᵃ and 37ᵃ may be bent inwardly toward one another.

Also the projection 39 may be formed by applying a punch to the strip 35 at the side thereof opposite that at which the wings and inturned portions 36ᵃ and 37ᵃ are located or are to be located, as is well known in the art.

Thus the female connectors 17 of the bus bars 14, 15 and 16 are formed entirely from integral portions of the bus bar itself without requiring any additional or attached parts for the purpose.

While I have shown and described my invention in a preferred form, I am aware that various changes and modifications may be made without departing from the principles of the invention, the scope of which is to be determined by the appended claim.

What is claimed is:

The combination with a plurality of electrical devices which have electrically conductive terminal members projecting externally therefrom through which electric current is supplied thereto, of an electrically conductive bus bar extending between and releasably connected electrically to a plurality of the terminal members of said devices for parallel supply of current thereto, the bus bar being an elongated metal strip and the terminal members being tongues which are spaced apart lengthwise of the strip and extend crosswise thereof underneath respective pairs of strip portions which are partially severed from the strip at places within the width of the strip and bent laterally therefrom along lines transverse to the length of the strip and lengthwise of the tongue to receive the tongues endwise thereunder, each said pair of strip portions having a part of the strip therebetween underlying and extending crosswise of the respective tongue in the direction of the length of the strip and releasably holding the tongue against the overlying pair of strip portions, each tongue being a thin strip of material having longitudinal portions thereof oppositely outturned at opposite sides respectively of the tongue along lines of bend extending lengthwise of the tongue which stiffen the tongue against bending thereof and increase the overall thickness of the tongue for snug sliding engagement with the respective overlying pairs of strip portions of the bus bar strip and with said underlying part of the bus bar strip.

References Cited in the file of this patent

UNITED STATES PATENTS

| | | |
|---|---|---|
| 1,069,065 | Horsfield | July 29, 1913 |
| 1,742,200 | Cowen | Jan. 7, 1930 |
| 1,995,115 | Douglas | Mar. 19, 1935 |
| 2,183,067 | Gardner | Dec. 12, 1939 |
| 2,336,385 | Batcheller | Dec. 7, 1943 |
| 2,451,393 | Kershaw | Oct. 12, 1948 |
| 2,634,312 | Batcheller | Apr. 7, 1953 |
| 2,709,341 | Gallagher et al. | May 31, 1955 |
| 2,727,219 | Bergan | Dec. 13, 1955 |

FOREIGN PATENTS

| | | |
|---|---|---|
| 591,584 | France | Dec. 8, 1924 |
| 809,214 | Germany | July 26, 1951 |